United States Patent
Hiller

(10) Patent No.: US 6,903,902 B1
(45) Date of Patent: Jun. 7, 2005

(54) LOAD/UNLOAD RAMPS AND THEIR COMPOSITIONS

(75) Inventor: Bernhard Hiller, San Jose, CA (US)

(73) Assignee: Maxtor Corporation, Longmont, CO (US)

( * ) Notice: Subject to any disclaimer, the term of this patent is extended or adjusted under 35 U.S.C. 154(b) by 164 days.

(21) Appl. No.: 10/159,827

(22) Filed: May 31, 2002

Related U.S. Application Data

(60) Provisional application No. 60/323,677, filed on Sep. 19, 2001.

(51) Int. Cl.$^7$ ............................................. G11B 21/22
(52) U.S. Cl. .................................................. 360/254.3
(58) Field of Search .......................... 360/254.7, 254.3, 360/254.8, 254.9; 442/99, 98, 46; 428/145, 1.25; 525/178; 369/263, 75.1, 75.2, 77.1, 77.2; 524/112; 602/52; 432/124; 439/98; 430/31

(56) References Cited

U.S. PATENT DOCUMENTS

| | | | | |
|---|---|---|---|---|
| 5,664,015 A | * | 9/1997 | Ford et al. ............. | 379/433.01 |
| 5,831,795 A | * | 11/1998 | Ma et al. ................. | 360/254.3 |
| 6,104,573 A | * | 8/2000 | Nicklos et al. .......... | 360/255.9 |
| 6,181,528 B1 | * | 1/2001 | Reinhart et al. ......... | 360/254.7 |
| 6,183,929 B1 | * | 2/2001 | Chow et al. ................ | 430/124 |
| 6,424,501 B1 | * | 7/2002 | Tsujino et al. ........... | 360/254.7 |
| 6,452,753 B1 | * | 9/2002 | Hiller et al. ............. | 360/254.7 |
| 2002/0123282 A1 | * | 9/2002 | McCarthy et al. .......... | 442/180 |

* cited by examiner

Primary Examiner—A. J. Heinz
Assistant Examiner—Mark Blouin
(74) Attorney, Agent, or Firm—Sheridan Ross P.C.

(57) ABSTRACT

Compositions and materials for use in load/unload ramps in magnetic disk drive assemblies are disclosed, particularly compositions or materials to improve at least one of the desired characteristics of low wear, low cost, high mechanical stability and high moldability. Thermoplastic polymers, such as acetal homopolyrners, acetal copolymers, polyetherimides, polyphenylene sulfides, and polysulfones, are combined with other compositions, such as polyaramides, to improve the characteristics of a load/unload ramp constructed therefrom. Additionally, another material may be added, such as a polytetrafluoroethylene or perfluoropolyether.

47 Claims, No Drawings

LOAD/UNLOAD RAMPS AND THEIR COMPOSITIONS

REFERENCE TO RELATED APPLICATION

This application claims priority from U.S. Provisional Patent Application No. 60/323,677 filed Sep. 19, 2001, which is incorporated herein by reference.

FIELD OF THE INVENTION

This invention generally relates to dynamic load/unload technology in magnetic disk drive assemblies and, more particularly, to the composition and construction of load/unload ramps.

BACKGROUND OF THE INVENTION

Disk drive memory systems store digital information on magnetic disks, which typically arc divided into concentric tracks, each of which are in turn divided into a number of sectors. The disks are rotatably mounted on a spindle and information is accessed by read/write head assemblies mounted on pivoting suspension arms able to move radially over the surface of the disks. The radial movement of the head assemblies allows different tracks to be accessed from the inside diameter to the outside diameter of the disks. Rotation of the disks allows the read/write heads to access different sectors of each track.

In general, head assemblies are part of an actuator assembly, which also typically includes a suspension assembly, a flexure member and an arm, among other things. Head assemblies typically include a magnetic transducer to write data onto a disk and/or read data previously stored on a disk. Head assemblies also typically include a body or slider having an air bearing surface which, in part, functions during operation to position the magnetic transducer a specified distance from the surface of the spinning disk. In general, it is advantageous to position the magnetic transducer as close as possible to the disk.

A primary goal of disk drive assemblies is to provide maximum recording density on the disk. A related goal is to increase reading efficiency or to reduce reading errors, while increasing recording density. Reducing the distance between the magnetic transducer and the recording medium of the disk generally advances both of those goals. Indeed, from a recording standpoint, the slider is ideally maintained in direct contact with the recording medium (the disk) to position the magnetic transducer as close to the magnetized portion of the disk as possible. However, since the disk rotates many thousands of revolutions per minute, continuous direct contact between the slider and the recording medium can cause unacceptable wear on these components. Excessive wear on the recording medium can result in the loss of data, among other things. Excessive wear on the slider can result in contact between the magnetic transducer and recording medium resulting in failure of the magnetic transducer or catastrophic failure.

In applications utilizing contact start/stop technology, when power to the disk drive is turned off, the suspension arm moves to the inner diameter of the disk and directs the head assembly to land on a specified area of the disk, commonly referred to as the Laser Texture Zone, located at the extreme inner diameter of the disk. At rest, the head assembly rests on the surface of the disk in the Laser Texture Zone. When power is turned back on, the disk starts to spin, generating a body of moving air above the disk that lifts the head assembly above the surface of the disk. The head assembly then is moved to the desired location relative to, and above, the spinning disk.

The Laser Texture Zone is designed to provide sufficient length and breadth to accommodate the landing of the head assembly onto the disk during power off, and to accommodate the lifting of the head assembly off of the surface of the disk during power on. The Laser Texture Zone obtains its name from its relatively rough surface with laser created bumps to reduce stiction of the recording head when at rest on the disk. Because of the interaction between the head assembly and disk, including the forces imparted during start and stop operations and the direct contact during power off, the Laser Texture Zone typically is not intended to store information.

Optimally, the head assembly contacts the disk only within the Laser Texture Zone. The remainder of the disk, other than the Laser Texture Zone, is designed to optimize the recording, storing and retrieving of information. This remainder of the disk, referred to as the Data Zone, extends outwards to the outside diameter of a typical disk. To protect the disk from impact forces and stiction forces from the head assembly, among other things, the base magnetic layer of a disk typically is covered with a protective layer of carbon overcoat and an outer layer of lubricant.

A more recent development in head-disk assembly tribology is dynamic load/unload technology. Rather than designing the head assembly to land on, rest on and lift off of the surface of the disk in the Laser Texture Zone, dynamic load/unload technology suspends the head assembly on a ramp, typically located in proximity to or outside of the outside diameter of the disk, although it may be located at any fixed radius. More specifically, a ramp is built into the housing of the magnetic disk drive assembly overhanging the outer most portion of the disk or adjacent the outside diameter of the disk. A tab or an extension of the suspension arm rests on the ramp, thereby suspending the head assembly, either above the disk or just beyond the outside diameter of the disk. Even at rest, the head assembly is designed to not be in direct contact with any part of the disk. When the power is turned on and after the disk is spinning, the head assembly is designed to move down the ramp and fly above the spinning disk.

Dynamic load/unload technology essentially has replaced contact start/stop technology in mobile products, such as lap top computers, and is in the process of doing so in non-mobile products, such as desktop and server computers. Dynamic load/unload technology is also essential technology in removable media drives, such Zip® drives. However, a limiting factor on the use of dynamic load/unload technology is the extent to which the composition and construction of the load/unload ramp itself impacts the design, manufacture and reliable operation of the disk drive assembly. A preferred ramp material has the properties of low wear, high mechanical stability, high moldability and low cost.

These desired properties have not been optimized in any one material or combination of materials. That is, a material with relatively low wear, low cost and high moldability may have poor mechanical stability. A different material with high mechanical stability may have high wear or high cost.

For example, the ramp may generate wear particles from the repeated landings and take-offs of the head assembly. Such wear particles nay settle on the surface of the disk and cause the head assembly to fly at a greater height than desired. Flying heights that are too high lead to higher error rates for both reading and writing data, while flying heights too low lead to disk wear and possible assembly head crashes. Accumulated wear particles may also pass under the slider and lead to thermal asperities or high-fly writes. As such, the ramp should be constructed of a material with low wear.

Another characteristic of a preferred ramp material is low deformation, also referred to as good mechanical stability, which generally includes low warpage, low thermal expansion, low water adsorption, high strength, high stiffness, low creep and low shrinkage. Deformation of the ramp material is a significant contributor in the very tight vertical dimensioning design for engagement of the load tab and ramp. In a worst case scenario, ramp deformation due to expansion, contraction or creep may cause the ramp to contact the spinning disk or cause the load tab to contact the front edge of the ramp.

Robust processing, also referred to as moldability, generally is the capability of the ramp material to be shaped or formed to the precise dimensions desired, stored, transported and installed in the disk drive assembly. Moldability is particularly important for fine features, such as ramp tips, which must be molded consistently. Also, better moldability includes process time, since a part that takes longer to mold is more expensive. A higher the level of moldability results in a higher yield, i.e., a higher number of ramps that are successfully installed in a disk drive assembly and a lower number of ramps and a lower amount of ramp material that must be recycled or discarded.

Existing disk drive products have used a variety of materials and combinations of materials for load/unload ramps. These materials typically are thermoplastic polymers, such as Delrin, an acetal homopolymer available from E.I. duPont de Nemours & Co. of Wilimington, Del. ("duPont") or Vectra, a liquid crystal polymer with Teflon fill available from Ticona, a subsidiary of Celanese, A.G. of Germany ("Ticona"). Each ofthese materials has performance drawbacks as a material for a load/unload ramp. For example, Delrin has relatively low wear, low cost and robust processing, but has relatively poor mechanical stability, particularly thermal expansion and shrinkage. Vectra has relatively higher wear, which negatively affects reliability of the disk drive assembly, and is relatively much more expensive. Other existing materials and combinations of materials have similar types of tradeoffs between desirable and undesirable characteristics.

As such, a need exists for improving the composition and characteristics of the load/unload ramp utilized in a magnetic disk drive assembly incorporating dynamic load/unload ramp technology by improving its mechanical stability, wear, cost and/or moldability.

DETAILED DESCRIPTION OF THE INVENTION

This invention generally is directed to dynamic load/unload technology in magnetic disk drive assemblies and, more particularly, to the composition, characteristics and construction of load/unload ramps. Load/unload ramps are typically made of various types of thermoplastic polymers, preferably with characteristics of low wear, low cost, high moldability and high mechanical stability, e.g., low shrinkage, low thermal expansion, low water absorption, high strength, high flexural modulus and low creep. All of these characteristics generally are not present or optimized in any one material, so the relative characteristics of various materials must be identified, analyzed and balanced for the particular application. For example, in certain high end applications, such as high performance laptop computers, desktop computers and server drives, cost is less of a factor, while low wear and high mechanical stability are more important. In lower end applications, such as entry level desktop computers, cost may become a primary factor. In a typical, middle range application, such as a multi-disk desktop disk drive assembly, one must balance each of the factors of wear, cost, moldability and mechanical stability. Further, within the factor of mechanical stability, one must identify and balance the relative significance of each constituent. In general, for the typical middle range application of the load/unload ramp, low thermal expansion is considered as the most significant constituent of mechanical stability, followed by low shrinkage.

Thermal expansion refers to the amount by which the load/unload ramp expands when exposed to elevated temperatures from operation of the disk drive assembly or from the environment. Preferably, thermal expansion of the load/unload ramp corresponds relatively closely to that of the material used most extensively throughout the disk drive assembly, typically aluminum (0.002%–0.003% per degree Celsius).

Low shrinkage refers to the amount by which the load/unload ramp shrinks after it is produced, typically by a molding process. Lower shrinkage of the load/unload ramp provides several advantages, including the ability to design and produce ramps with smaller manufacturing tolerances. The remaining constituents of mechanical stability are factors to consider in designing and building a load/unload ramp, but generally are less of a concern for load/unload ramps for typical applications.

The present invention discloses an improvement of load/unload ramps by utilizing a composition or material, or a combination of compositions or materials, to improve the performance characteristics of an load/unload ramp. In general, one must identify the desired base material to be employed, typically a thermoplastic, identify the relative characteristics of wear, mechanical stability, cost and moldability of the desired base material identify and categorize the relative priority of each characteristic for the particular application, identify potential additional materials or combination of materials, and their respective amounts to be added, and analyze the resulting combination(s) to determine the level of improvement, if any, to the overall performance of the base material for use as a load/unload ramp.

In one embodiment of the invention an acetal homopolymer, such as Delrin®, is used as the desired base material. As noted above, acetal homopolymers generally have characteristics of good wear, lost cost and relatively poor mechanical stability in a load/unload ramp application. In particular, it is desirable to improve the relatively high levels of thermal expansion of acetal homopolymers. This may advantageously be achieved by the addition of another material, which may be compounded, blended, mixed, alloyed or otherwise combined with the acetal homopolymer.

One such additional material is polytetrafluoroethylene ("PTFE"), also known as and available under the trademark TEFLON® from duPont. Relative to acetal homopolymer, PTFE generally has lower wear, comparable costs and comparable mechanical stability characteristics. In this application, PTFE is added in amounts sufficient to improve the overall performance of the acetal homopolymer for a load/unload ramp application, and preferably in the amounts of approximately 0% to approximately 30% PTFE, more preferably approximately 5% to approximately 20% PTFE, even more preferably approximately 10% to approximately 15% PTFE and most preferably approximately 10% PTFE.

In another embodiment, an acetal homopolymer, such as Delrin®, is again used as the base thermoplastic material, to which is added perfluoropolyether ("PFPE"), compounded by RTP Plastics Company of Winona, Minn. In general like PTFE, PFPE is a solid lubricant added to reduce wear. PFPE is added to the acetal homopolymer base material in amounts sufficient to improve the overall characteristics of that material for use as an load/unload ramp. Preferably PFPE is added in amounts of approximately 0% to approximately 10%, more preferably approximately 0.5 to approximately 5% and even more preferably approximately 1% PFPE.

Aramid fibers are a family of polyamides and are commercially available in a variety of compositions. Aramid fibers, such as Kevlar®, available from duPont, are another additional material that may be advantageously used in a composition for use as a load/unload ramp. Aramid fibers generally are difficult to use with acetal homopolymers due to the relatively tightly polymerized formaldehyde monomers in the polymer chain. However, this is less of an issue with acetal copolymers, which as a copolymer includes a second monomer polymerized with the primary monomer. Due to their relative softness, aramid fibers generally are preferred over glass fibers in disk drive applications. For example, contrary to glass fibers, aramid fibers will not scratch the disk overcoat.

As such, in yet another embodiment of the invention, a load/unload ramp is formed from a base material of an acetal copolymer, with an additional material of an aromatic polyamide, such as an aramid fiber Acetal copolymers are commercially available in a variety of compositions. An acetal copolymer that may be used to form a load/unload ramp is available under the trademark CELCON® from Ticona. Like the acetal homopolyrner, acetal copolymer generally demonstrates very good wear properties and relatively low cost, but not as good mechanical stability, particularly thermal expansion.

The addition of aramid fibers generally improves shrinkage, thermal expansion, mechanical strength and wear of a base thermoplastic used to form a load/unload ramp. Adding aramid fibers in amounts as little as approximately 1% up to as much as approximately 30% aramid fibers provide advantages in this application. Preferably, aramid fibers are added in amounts of approximately 5% to approximately 20%, more preferably approximately 10% to approximately 15% and even more preferably approximately 15%.

A further embodiment of the invention provides a load/unload ramp formed from an acetal copolymner, such as CELCON, with both an aramnid fiber and an a second additional material, to further improve the characteristics of the load/unload ramp, particularly wear. For example, a load/unload ramp of the present invention may be formed from an acetal copolymer with approximately 1% to approximately 30% aramid fiber and with approximately 0% to approximately 10% additional material, such as PTFE or PFPE. The identity and relative quantity of the additional material depends on the particular application. For a load/unload ramp in a typical middle range application, the acetal copolymer base material preferably is formed with approximately 5% to approximately 20% aramid fiber and with approximately 1% to approximately 10% PTFE, more preferably with approximately 10 to approximately 15% aramid fiber and approximately 2% to approximately 5% PTFE and even more preferably approximately 15%, aramid fiber and approximately 5% PTFE. Alternatively, the base material of acetal copolymer may be combined with aramid fiber and PFPE, in sufficient amounts to enhance the desired characteristics for a load/unload ramp application. Here, the load/unload ramp material may be advantageously formed from an acetal copolymer with approximately 5% to approximately 20% aramid fiber and with approximately 0.1% to approximately 10% PFPE, more preferably with approximately 10% to approximately 15% aramid fibers and approximately 0.5% to approximately to 5% PFPE and even more preferably with approximately 15% aramid fibers and approximately 1% PFPE.

In a further embodiment of the invention, a load/unload ramp is formed from a poly-etherimide, also known as PEI and available commercially under the trademark Ultem® from GE Plastics of Pittsfield, Mass. For purposes of a load/unload ramp, PEI generally molds well and demonstrates a relatively low level of thermal expansion, but has relatively poor wear characteristics and is relatively expensive. To improve these characteristics of PEI for use as a load/unload ramp, a polyaramide, such as aramid fibers, are added, preferably in amounts of approximately 0% to approximately 30%, more preferably approximately 5% to approximately 20%, even more preferably approximately 10% to approximately 15% and most preferably approximately 15%. Additionally, another material, such as, PTFE and/or PFPE, may also be added to the PEI, with or without the polyaramide, particularly to improve wear characteristics. Preferably, PTFE is added in amounts of approximately 0% to approximately 30%, more preferably approximately 5% to approximately 20%, even more preferably approximately 10% to approximately 15%, and most preferably approximately 15%. In a most preferred embodiment using PEI as the base material, a load/unload ramp is formed of PEI, with approximately 15% aramid fiber and approximately 15% PTFE.

Alternatively, PFPE may be added to the PEI base polymer, with or without the aramid fiber added. Preferably, PFPE is added in amounts of approximately 0.1% to approximately 10% PFPE, more preferably approximately 0.5% to approximately 5% PFPE and even more preferably approximately 1% PFPE. In a most preferred embodiment of this combination of PEI, aramid fiber and PFPE, a load/unload ramp is formed of PEI, approximately 15% aramid fiber and approximately 1% PFPE.

In another embodiment of the invention, a load/unload ramp is formed from a polyphenylene sulfide, also known as PPS and available commercially under the trademark Forton from Ticona. For purposes of a load/unload ramp, PPS generally molds well and demonstrates a relatively low level of thermal expansion, but has relatively poor wear characteristics and is relatively expensive. To improve these characteristics of PPS for use as a load/unload ramp, polyaramide, such as aramid fibers, are added, preferably approximately 0% to approximately 30%, more preferably approximately 5% to approximately 20%, even more preferably approximately 10% to approximate 15% and most preferably approximately 15%. Additionally, PTFE or PFPE may also be added to the PPS, with or without the polyaramide, particularly to improve wear characteristics. Preferably, PTFE is added in amounts of approximately 0% to approximately 30%, more preferably approximately 5% to approximately 20% and even more preferably approximately 10% to approximately 15%, and most preferably approximately 15%. In a most preferred embodiment using PPS as the base material a load/unload ramp is formed of PPS, with approximately 15% aramid fiber and approximately 15% PTFE.

Alternatively, PFPE may be added to the PPS base polymer, with or without the aramid fiber added. Preferably, PFPE is added in amounts of approximately 0.1% to approximately 10% PFPE, more preferably approximately 0.5% to approximately 5% PFPE even more preferably approximately 1% PFPE. In a most preferred embodiment of this combination of PPS, aramid fibers and PFPE, a load/unload ramp is formed of PPS, approximately 15% aramid fiber and approximately 1% PFPE.

In another embodiment of the invention, a load/unload ramp is formed from a polysulfone sulfide, also known as PSU and available commercially under the trademark Ultrason® from BASF Corporation of Germany. For purposes of a load/unload ramp, PSU generally molds well and demonstrates a relatively low level of thermal expansion, but has relatively poor wear characteristics and is relatively expensive. To improve these characteristics of PSU for use as a load/unload ramp, aramid fibers are added, preferably approximately 0% to approximately 30%, more preferably approximately 5% to approximately 20%, even more preferably approximately 10% to approximately 15% and most preferably approximately 15%. Additionally, PTFE or PFPF may also be added to the PSU, with or without the aramid fiber, particularly to improve wear characteristics. Preferably, PTFE is added in amounts of approximately 0% to approximately 30%, more preferably approximately 5% to approximately 20% and even more preferably approximately 10% to approximately 15%, and most preferably approximately 15%. In a most preferred embodiment using PSU as the base material, a load/unload ramp is formed of PSU, with approximately 15% aramid fiber and approximately 15% PTFE.

Alternatively, PFPE may be added to the PSU base polymer, with or without the aramid fiber added. Preferably, PFPE is added in amounts of approximately 0.1 to 10% PFPE, more preferably approximately 0.5% to 5% PFPE and, even more preferably approximately 1% PFPE. In a most preferred embodiment of this combination of PSU, aramid fibers and PFPE, a load/unload ramp is formed of PSU, approximately 15% aramid fiber and approximately 1% PFPE.

A variety of materials and combinations of materials were tested and analyzed with respect to wear performance. The results of nine different examples are shown below in Table. 1. These tests were conducted to 300,000 load/unload cycles. The rating levels were based on wear particle production and were categorized as follows: 1 (very good, virtually particle free); 2 (good, some particles); 3 (acceptable, particles obvious); 4 (marginal, may work); 5 (unacceptable, too many particles).

TABLE 1

| Examples | Material | Filler | Manufacturer, Number | $1^{st}$ run | $2^{nd}$ run | $3^{rd}$ run | Average |
|---|---|---|---|---|---|---|---|
| 1 | Acetal Homopolymer (Delrin ®) | Neat | Dupont Delrin 500P NC010 | 2 | 1 | 1 | 1.3 |
| 2 | Liquid Crystal Polymer (Vectra ®) | 20–25% PTFE | Ticona Vectra A430 | 3 | 3 | 3 | 3 |
| 3 | Acetal Homopolymer | 1% PFPE | RTP 899 X 89467 | 1 | 3 | 3 | 2.3 |
| 4 | Acetal Homopolymer | 10% PTFE | RTP 899 X 89731 | 1 | 2 | 2 | 1.7 |
| 5 | Acetal Copolymer | 5% Aramid 5% PTFE | RTP 899 X 89728 A | 3 | 2 | 3 | 2.7 |
| 6 | Acetal Copolymer | 15% Aramid 5% PTFE | RTP 899 X 89728 B | 3 | 2 | 2 | 2.3 |
| 7 | Polyetherimide (PEI) | 15% Aramid 15% PTFE | RTP 2199 X 71009 C | 4 | 4 | 4 | 4 |
| 8 | Polyphenylene sulfide (PPS) | 15% Aramid 15% PTFE | RTP 1399 X 89729 | 4 | 4 | 4 | 4 |
| 9 | Polysulfone (PSU) | 15% Aramid 15% PTFE | RTP 999 X 89730 | 3 | 3 | 3 | 3 |

In addition to the wear performance test results shown in Table 1, the various materials were analyzed with respect to mechanical stability and cost and compared as possible materials for a load/unload ramp in the applications discussed above. Table 2 shows relevant material properties and approximate pricing in 2001 and Table 3 shows the results of the analysis of relative wear, mechanical stability and cost.

TABLE 2

| Examples | Material | Filler | Manufacturer, Number | Price per Volume (2001) [cents/cm] | Shrinkage, 1/8 slab [%] | Water absorption, 24 h, 23 C. [%] | Thermal expansion X$10^{-6}$/C. | Flexural modulus [MPa] |
|---|---|---|---|---|---|---|---|---|
| 1 | Acetal Homopolymer (Delrin) | Neat | Dupont Delrin 500P NC010 | 0.5 | 2.0 | 0.34 | 120 | 2900 |
| 2 | Liquid Crystal Polymer (Vectra) | 20–25% PTFE | Ticona Vectra A430 | 5.9 | 0.1 | 0.02 | 85 | 7000 |
| 3 | Acetal Homopolymer | 1% PFPE | RTP 899 X | 10.7 | 2.0 | 0.3 | 120 | 2900 |

TABLE 2-continued

| Examples | Material | Filler | Manufacturer, Number | Price per Volume (2001) [cents/cm] | Shrinkage, 1/8 slab [%] | Water absorption, 24 h, 23 C. [%] | Thermal expansion X10⁻⁶/C. | Flexural modulus [MPa] |
|---|---|---|---|---|---|---|---|---|
| 4 | Acetal Homopolymer | 10% PTFE | RTP 899 X 89467 | 9.0 | 2.0 | 0.3 | 100 | 2700 |
| 5 | Acetal Copolymer | 5% Aramid 5% PTFE | RTP 899 X 89731 89728 A | 1.2 | 1.7 | 0.25 | 72 | 2500 |
| 6 | Acetal Copolymer | 15% Aramid 5% PTFE | RTP 899 X 89728 B | 1.8 | 1.1 | 0.25 | 45 | 3400 |
| 7 | Polyetherimide (PEI) | 15% Aramid 15% PTFE | RTP 2199 X 71009 C | 3.7 | 0.5 | 0.2 | 31 | 4100 |
| 8 | Polyphenylene sulfide (PPS) | 15% Aramid 15% PTFE | RTP 1399 X 89729 | 3.3 | 0.5 | 0.02 | <49 | 5200 |
| 9 | Polysulfone (PSU) | 15% Aramid 15% PTFE | RTP 999 X 89730 | 2.9 | 0.4 | 0.25 | 56 | 2800 |

TABLE 3

| Examples | Material | Filler | Manufacturer, Number | Wear | Mechanical Stability | Cost |
|---|---|---|---|---|---|---|
| 1 | Acetal Homopolymer (Delrin) | Neat | Dupont Delrin 500P NC010 | 1.3 | 4 | 1 |
| 2 | Liquid Crystal Polymer (Vectra) | 20–25% PTFE | Ticona Vectra A430 | 3 | 2.5 | 5 |
| 3 | Acetal Homopolymer | 1% PFPE | RTP 899 X 89467 | 2.3 | 4 | 2 |
| 4 | Acetal Homopolymer | 10% PTFE | RTP 899 X 89731 | 1.7 | 4 | 2 |
| 5 | Acetal Copolymer | 5% Aramid 5% PTFE | RTP 899 X 89728 A | 2.7 | 2.5 | 2 |
| 6 | Acetal Copolymer | 15% Aramid 5% PTFE | RTP 899 X 89728 B | 2.3 | 1.5 | 2 |
| 7 | Polyetherimide (PEI) | 15% Aramid 15% PTFE | RTP 2199 X 71009 C | 4 | 1 | 4 |
| 8 | Polyphenylene sulfide (PPS) | 15% Aramid 15% PTFE | RTP 1399 X 89729 | 4 | 1.5 | 3.5 |
| 9 | Polysulfone (PSU) | 15% Aramid 15% PTFE | RTP 999 X 89730 | 3 | 2 | 3 |

As shown in Tables 2 and 3, there are several combinations of material and filler that may satisfactorily perform as material in an load/unload application and which may surpass the overall performance of the existing acetal homopolymer and the existing liquid crystal polymer. For example, Example 6, an acetal copolymer with approximately 15% aramid fibers and 5% PTFE, exhibits significantly improved mechanical stability over the acetal homopolymer, while only slightly increasing the cost and still demonstrating good wear performance. Similarly, Example 6 demonstrates improved wear over the liquid crystal polymer, with greater mechanical stability at significantly lesser cost. Also, Example 5, the acetal copolymer with only 5% aramid fibers added and 5% PTFE, demonstrates slightly lower wear performance, lower mechanical stability then Example 6, but still improved over that of the existing acetal homopolyrner and the existing liquid crystal polymer.

Examples 5 and 6 demonstrate a surprising result of the disclosed invention that adding aramid increase mechanical stability, while not decreasing wear performance as much as expected. Conventional wisdom would indicate that adding aramid would significantly decrease wear performance. However, the 15% aramid added in Example 6 improved mechanical stability and resulted in substantially similar wear performance as that of Example 5, which added 5% aramid.

As shown in Tables 2 and 3, various combinations of base materials (acetal homopolymers, acetal copolymers, PEI, PPS and/or PSU), and additional materials (polyaramides, PTPE and/or PFPE) result in improved performance for use as a load/unload ramp in a magnetic disk drive assembly.

The foregoing description of the present invention has been presented for purposes of illustration and description. The description is not intended to limit the invention to the form disclosed herein. Consequently variations and modifications commensurate with the above teachings and the skill or knowledge of development art are within the scope of the present invention. The embodiments described herein are further intended to explain the best mode known for proximate invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A composition for use in a load/unload ramp in a magnetic disk drive assembly comprising polyaramide, a thermoplastic polymer selected form the group consisting of acetal homopolymers, acetal copolymers, polyetherimides, polyphenylene sulfides and polysulfones, and polytetrafluoroethylene, wherein said composition comprises approximately 1% to approximately 20% by weight polytetrafluoroethylene.

2. A composition for use in a load/unload ramp in a magnetic disk drive assembly comprising polyaramide, a thermoplastic polymer selected form the group consisting of acetal homopolymers, acetal copolymers, polyetherimides, polyphenylene sulfides and polysulfones, and polytetrafluoroethylene, wherein said composition comprises approximately 2% to approximately 15% by weight polytetrafluoroethylene.

3. A composition for use in a load/unload ramp in a magnetic disk drive assembly comprising polyaramide, a thermoplastic polymer selected form the group consisting of acetal homopolymers, acetal copolymers, polyetherimides, polyphenylene sulfides and polysulfones, and polytetrafluoroethylene, wherein said composition comprises approximately 3% to approximately 10% by weight polytetrafluoroethylene.

4. A composition for use in a load/unload ramp in a magnetic disk drive assembly comprising polyaramide, a thermoplastic polymer selected form the group consisting of acetal homopolymers, acetal copolymers, polyetherimides, polyphenylene sulfides and polysulfones, and polytetrafluoroethylene, wherein said composition comprises approximately 5% by weight polytetrafluoroethylene.

5. A composition for use as a load/unload ramp in a magnetic disk drive assembly comprising,
   at least one thermoplastic polymer selected from the group consisting of acetal homopolymers, acetal copolymers, polyetherimides, polyphenylene sulfides, and polysulfones,
   approximately 1% to approximately 30% by weight polyaramide, and
   approximately 1% to approximately 20% by weight polytetrafluoroethylene.

6. The composition of claim 5, wherein said composition comprises approximately 5% to approximately 20% by weight polyaramide.

7. The composition of claim 5, wherein said composition comprises approximately 10% to approximately 15% by weight polyaramide.

8. The composition of claim 5, wherein said composition comprises approximately 15% by weight polyaramide.

9. The composition of claim 5, wherein said composition comprises approximately 2% to approximately 15% by weight polytetrafluoroethylene.

10. The composition of claim 5, wherein said composition comprises approximately 3% to approximately 10% by weight polytetrafluoroethylene.

11. The composition of claim 5, wherein said composition comprises approximately 5% by weight polytetrafluoroethylene.

12. The composition of claim 5, wherein said composition comprises approximately 5% to approximately 20% by weight polyaramide and approximately 2% to approximately 15% by weight polytetrafluoroethylene.

13. The composition of claim 5, wherein said composition comprises approximately 10% to approximately 15% by weight polyaramide and approximately 3% to approximately 10% by weight polytetrafluoroethylene.

14. The composition of claim 5, wherein said composition comprises approximately 15% by weight polyaramide and approximately 15% by weight polytetrafluoroethylene.

15. A composition for use as a load/unload ramp in a magnetic disk drive assembly comprising,
   an acetal copolymer, and
   approximately 1% to approximately 30% by weight polyaramide.

16. The composition of claim 15, wherein said composition comprises approximately 5% to approximately 20% by weight polyaramide.

17. The composition of claim 15, wherein said composition comprises approximately 10% to approximately 15% by weight polyaramide.

18. The composition of claim 15, wherein said composition comprises approximately 15% by weight polyaramide.

19. The composition of claim 15, further comprising approximately 1% to approximately 20% by weight polytetrafluoroethylene.

20. The composition of claim 15, further comprising approximately 2% to approximately 15% by weight polytetrafluoroethylene.

21. The composition of claim 15, further comprising approximately 3% to approximately 10% by weight polytetrafluoroethylene.

22. The composition of claim 15, further comprising approximately 5% by weight polytetrafluoroethylene.

23. The composition of claim 19, wherein said composition comprises approximately 5% to approximately 20% by weight polyaramide and approximately 2% to approximately 15% by weight polytetrafluoroethylene.

24. The composition of claim 19, wherein said composition comprises approximately 10% to approximately 15% by weight polyaramide and approximately 3% to approximately 10% by weight polytetrafluoroethylene.

25. The composition of claim 19, wherein said composition comprises approximately 15% by weight polyaramide and approximately 5% by weight polytetrafluoroethylene.

26. The composition of claim 15, further comprising approximately 0.1% to approximately 10% by weight perfluoropolyether.

27. The composition of claim 15, further comprising approximately 0.5% to approximately 5% perfluoropolyether.

28. The composition of claim 15, further comprising approximately 1% by weight perfluoropolyether.

29. The composition of claim 26, wherein said composition comprises approximately 5% to approximately 20% by weight polyaramide and approximately 0.1% to approximately 10% perfluoropolyether.

30. The composition of claim 26, wherein said composition comprises approximately 10% to approximately 15% by weight polyaramide and approximately 0.5% to approximately 5% by weight perfluoropolyether.

31. The composition of claim 15, wherein said composition comprises approximately 15% by weight polyaramide and approximately 15% by weight polytetrafluoroethylene.

32. The composition of claim 26, wherein said composition comprises approximately 15% by weight polyaramide and approximately 1% by weight perfluoropolyether.

33. A load/unload ramp for a magnetic disk drive assembly, said load/unload ramp comprising polyaramide and a thermoplastic polymer selected from the group consisting of acetal homopolymers, acetal copolymers, polyetherimides, polyphenylene sulfides, and polysulfones.

34. The load/unload ramp of claim 33, wherein said polyaramide is approximately 1% to approximately 30% of the weight of said load/unload ramp.

35. The load/unload ramp of claim 33, wherein said polyaramide is approximately 5 to 20% of the weight of said load/unload ramp.

36. The load/unload ramp of claim 33, wherein said polyaramide is approximately 10% to approximately 15% of the weight of said load/unload ramp.

37. The load/unload ramp of claim 33, wherein said polyaramide is approximately 15% of the weight of said load/unload ramp.

38. The load/unload ramp of claim 33, further comprising polytetrafluoroethylene.

39. The load/unload ramp of claim 38, wherein said polytetrafluoroethylene comprises approximately 1% to approximately 20% of the weight of said load/unload ramp.

40. The load/unload ramp of claim 38, wherein said polytetrafluoroethylene comprises approximately 2% to approximately 15% of the weight of said load/unload ramp.

41. The load/unload ramp of claim 38, wherein said polytetrafluoroethylene comprises approximately 3% to approximately 10% of the weight of said load/unload ramp.

42. The load/unload ramp of claim 38, wherein said polytetrafluoroethylene comprises approximately 5% of the weight of said load/unload ramp.

43. The load/unload ramp of claim 38, further comprising perfluoropolyether.

44. The load/unload ramp of claim 43, wherein said perfluoropolyether comprises approximately 0.1% to approximately 10% of the weight of said load/unload ramp.

45. The load/unload ramp of claim 43, wherein said perfluoropolyether comprises approximately 0.5% to approximately 5% of the weight of said load/unload ramp.

46. The load/unload ramp of claim 43, wherein said perfluoropolyether comprises approximately 1% to approximately 3% of the weight of said load/unload ramp.

47. The composition of claim 43, wherein said composition comprises approximately 1% by weight perfluoropolyether.

* * * * *

UNITED STATES PATENT AND TRADEMARK OFFICE
CERTIFICATE OF CORRECTION

PATENT NO. : 6,903,902 B1
DATED : June 7, 2005
INVENTOR(S) : Hiller

It is certified that error appears in the above-identified patent and that said Letters Patent is hereby corrected as shown below:

Column 10,
Line 63, please delete "form" and replace with -- from -- therein.

Column 11,
Lines 3, 11 and 19, please delete "form" and replace with -- from -- therein.

Signed and Sealed this

Sixth Day of September, 2005

JON W. DUDAS
*Director of the United States Patent and Trademark Office*